April 6, 1926. 1,579,796
T. SHIELS
CLEANSING MEANS FOR MILKING MACHINE TEAT CUPS
Filed July 1, 1925 2 Sheets-Sheet 1
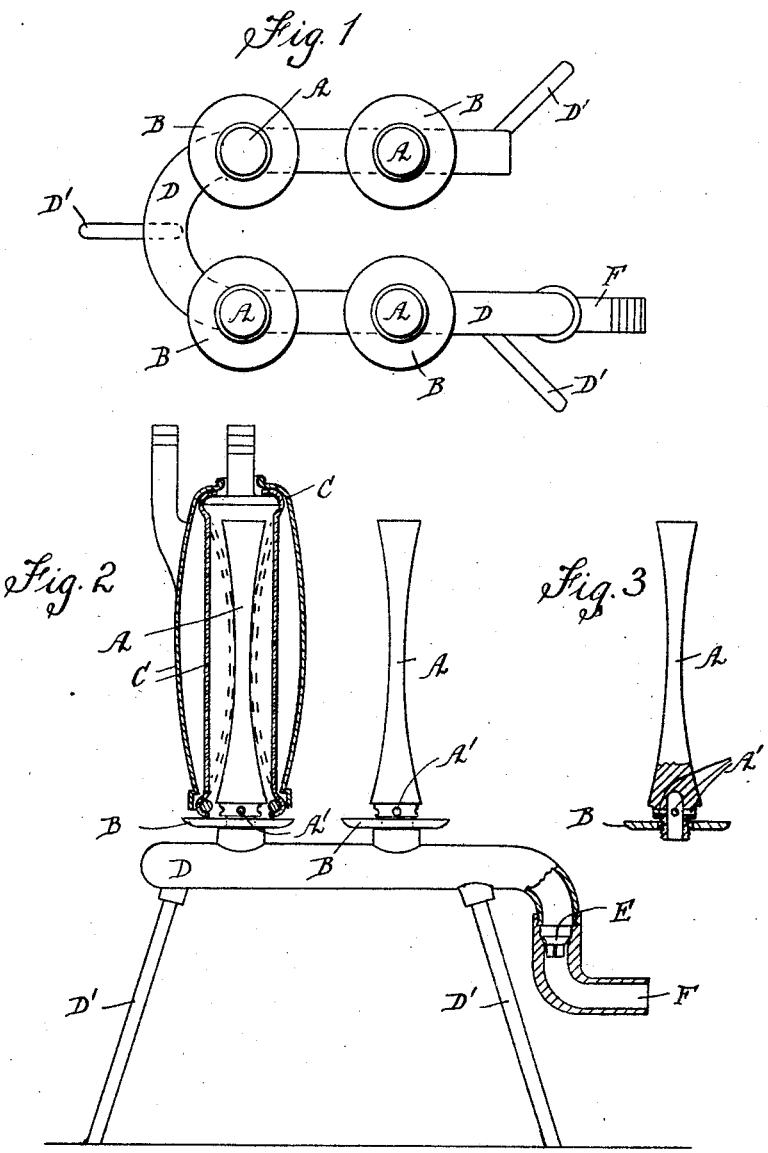
Inventor:
Thomas Shiels
By [signature]
Attorney April 6, 1926.   1,579,796
T. SHIELS
CLEANSING MEANS FOR MILKING MACHINE TEAT CUPS
Filed July 1, 1925    2 Sheets-Sheet 2
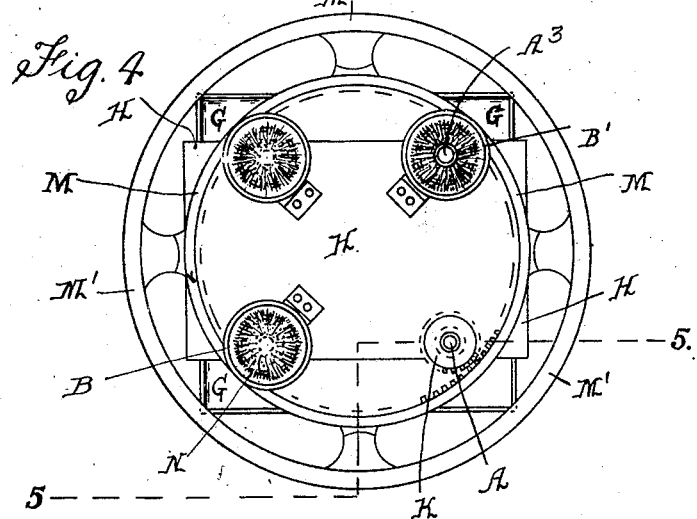
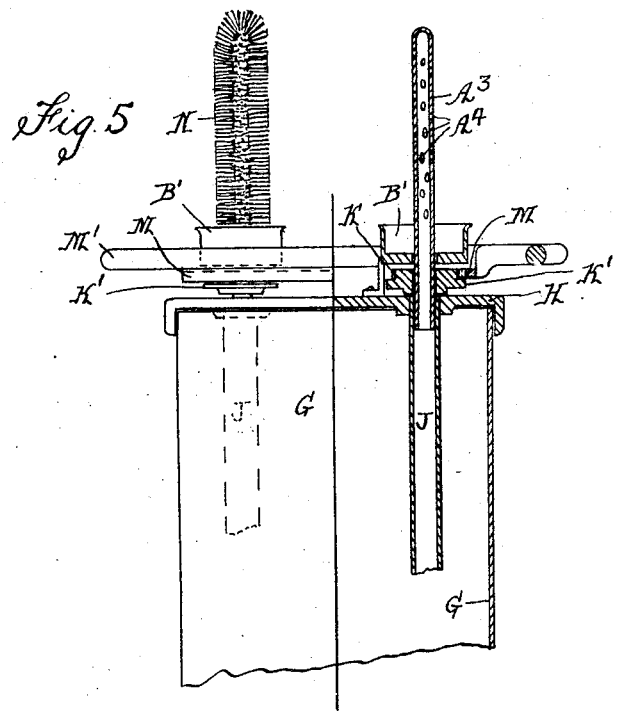
Inventor:
Thomas Shiels
By
Attorney.

Patented Apr. 6, 1926.

1,579,796

UNITED STATES PATENT OFFICE.

THOMAS SHIELS, OF INVERCARGILL, NEW ZEALAND.

CLEANSING MEANS FOR MILKING-MACHINE TEAT CUPS.

Application filed July 1, 1925. Serial No. 40,819.

*To all whom it may concern:*

Be it known that I, THOMAS SHIELS, subject of the King of Great Britain, residing at Leven Street, Invercargill, in the Dominion of New Zealand, have invented a new and useful Cleansing Means for Milking-Machine Teat Cups, of which the following is a specification.

This invention has been devised with the object of providing means whereby the teat cups of a milking machine installation may be internally cleansed in an effective and expeditious manner.

It is a well known expedient in the cleansing of these cups, after milking has taken place, to immerse the cups in the cleansing water while they are still connected with the suction main of the installation, so that the water is drawn in through the cups and thence through the suction pipe system, to effect the cleansing. This operation is not always effective as the water rushes straight through the cups and fails to impart a proper scouring action thereon.

The means now devised and forming the subject of the present case provide for the teat cups being cleansed by the submission of their internal surfaces to a spraying scouring action produced by the usual working of the teat cups by the suction acting on their inside spaces and by the pulsator acting on their resilient inflation linings.

In one form of the apparatus designed to provide for this action, a water scouring action alone is produced, while in another form, this action is combined with the brushing action of rotating brushes engaging the inside surfaces of the teat cups.

In fully explaining the invention, reference is made to the accompanying drawings, in which:—

Figure 1 is a plan, and

Figure 2 an elevation, partly in section, of the first mentioned form of apparatus; a teat cup, in section, being shown in operative position upon one of the units.

Figure 3 is a detail view, partly in section, of one of the units employed in this apparatus.

Figure 4 is a plan of the second form of apparatus.

Figure 5 is an elevation thereof, partly in section, taken on the line 5—5 of Figure 4.

In each instance, a core piece A is provided for each of the four teat cups of a set, and is supported to extend vertically from a suitable support. Each of these core pieces is made hollow and with spray holes A' in its wall and communicates with a source of cleansing fluid supply. Each core piece also has a ledge B surrounding its lower end so that a teat cup, as C in Figure 2, may be placed top end down, to rest on the ledge and to make airtight joint therewith.

The four teat cups of a set having thus been respectively placed over the four core pieces, and the cups connected with suction in the usual milking manner, and also pulsated to cause the inflation linings to contract and expand in the usual milking way, cleansing fluid will be drawn through the spray openings A' and sprayed into the cups, while the working of the inflations will cause such fluid to be given a surging action that will effectually cleanse the internal cup surfaces.

In the form of apparatus shown in Figures 1 to 3, the several sprayer cores are fitted by screwing into a U-shaped length of piping D at the necessary distances apart to allow room for the four teat cups. One end of this pipe is closed and its other end is connected through a suitable non-return valve E, to a hose-connecting piece F so that the pipe D, which forms a water chamber, may be connected with a storage tank containing the cleansing fluid. The object of the non-return valve E is to prevent the fluid surging back through the connection F each time the inflation linings of the teat cups contract in their internal area during the pulsations thereof.

The pipe D is supported upon legs D' which keep it level at the required elevation.

In this case, the bore of the core A extends only partially into the core height and the spray apertures A' open from near the bottom thereof. The shape of the core also is made such that it conforms lengthwise with the form taken by the teat cup inflation lining as it is forced inward during its pulsation, as indicated by the dotted lines in Figure 2.

The flange B also is formed by a flat disc plate that is held between the pipe D and a shoulder formed near the core bottom.

The form of apparatus shown in Figures 4 and 5 is designed to fit on to the open top of a water tank G and to draw its cleansing water from a supply placed in such tank. It is also designed to provide the brushing action before mentioned, if so required, and to impart a rotation to the cores A³, and circular brushes N mounted thereon, within the teat cups.

It embodies a plate H designed to fit upon and cover the tank G.

Fitted into the cover plate at approved and regular distances apart, are the four tubes J which extend down into the tank G to any desired depth. Each of these tubes forms a bearing for the hollow core A³ which is fitted into its upper end and which has a pinion wheel K fixed thereon. The centres of the several pinion wheels are radially equi-distant from a central point of the cover plate.

A toothed ring M, having gear teeth on its internal periphery, is provided to encircle and gear with all of the pinions K, such ring being attached to a hand wheel M' of annular form, to enable it to be rotated. The said ring is supported in any suitable manner to keep it in gear with the several pinions, as for instance by resting upon flanges K' with which such pinions are formed. The turning of the handwheel will therefore impart rotation to each of the pinions K and to each of the cores A³.

Each core A³ is made with a number of perforations A⁴ in its wall and each may be made of any approved length, but preferably of a length such that it will extend throughout most of the length of the teat cup placed top downwards over it. Each core may also form the centre core of a cylindrical brush N, or it may be left bare, according to whether a combined brushing and scouring action, or a scouring action alone, is desired.

The teat cup support B' provided for each unit thus formed, in this instance consists of a cylindrical rimmed plate that is fixed to the plate H and extends over the top of the pinion K with which it is concerned. The core A³ passes loosely through an aperture, made in the centre of the plate for that purpose. This support also serves to keep the pinion and core in position.

In operation, the four teat cups, while still connected with the milking machine, are placed mouth down respectively over the four cores or cores and brushes, so that their mouths rest upon the supports B and make air-tight connection therewith. The suction through the cups will then draw the cleansing liquid from the container G up through the tubes J and through the cores A³ so that it will be sprayed through the apertures A⁴ all over the internal surfaces of the cup inflation linings and then drawn away to the suction tank. At the same time rotation may be imparted to each brush or core so that the inflations may also be brushed, or the water sprays, if the cores alone are used, caused to swirl within the cups to increase the scouring action.

I claim:—

1. Teat cup cleansing apparatus for suction-operated milking machinery, comprising a set of perforated vertical cores in communication at their lower ends with a source of cleansing fluid supply; and a member encircling the lower end of each core for supporting an inverted teat cup which is passed over the respective core and which rests top end down upon such member to make an air-tight joint therewith while its other end remains connected with a source of suction whereby the cleansing fluid will be drawn upward by the suction through the lower ends of the cores and sprayed through the perforations in said cores against the internal walls of the cups.

2. Teat cup cleansing apparatus for suction-operated milking machinery, comprising a set of perforated vertical cores in communication at their lower ends with a source of cleansing fluid supply; a member encircling the lower end of each core for supporting an inverted teat cup which is passed over the respective core and which rests top end down upon such member to make an air-tight joint therewith while its other end remains connected with a source of suction, whereby the cleansing fluid will be drawn upward by the suction through the lower ends of the cores and sprayed through the perforations in said cores against the internal walls of the cups; a pinion secured to each core; and means for rotating all the pinions simultaneously.

3. Cleansing apparatus, comprising a set of perforated vertical cores in communication at their lower ends with a source of cleansing fluid supply; a member encircling the lower portion of each core for supporting an article to be cleaned which is passed over the core and rests top end down in an inverted position upon such member; a pinion secured to each core; an internally-toothed ring encircling all the pinions and meshing with the same to rotate them simultaneously; and an outer hand-wheel disposed concentric with and attached to said ring for rotating it.

4. Cleansing apparatus, according to claim 3, in which the several pinions are formed with circumferential supporting flanges whereon the toothed ring rests, to keep said ring in mesh therewith.

5. Cleansing apparatus, comprising a receptacle to contain cleansing fluid; a cover therefor; a set of perforated, hollow vertical cores rotatably mounted in openings in said cover and communicating at their lower ends with the fluid in said receptacle to enable said fluid to enter the cores and be sprayed through the perforations therein; a set of circular rimmed plates, one for each core and through which the core projects upwardly, fixed to said cover to support the articles to be cleaned, such articles being passed over the cores and resting top end down in inverted position upon said plates; a pinion secured to each core; an internally-toothed ring encircling all the pinions and meshing with the same to rotate them simultaneously; and an outer hand-wheel disposed concentric with and attached to said ring for rotating it.

In testimony whereof, I affix my signature.

THOMAS SHIELS.